GREENE & DYER.
Velocipede.
No. 91,535.　　　　　　　　　　　　Patented June 22, 1869.
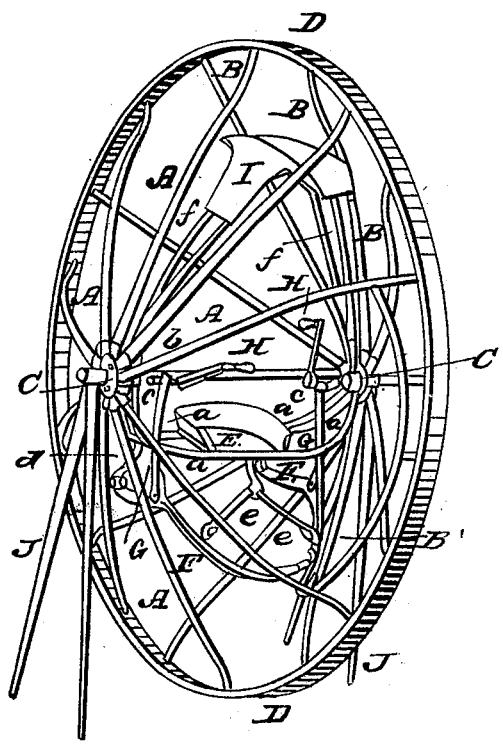

United States Patent Office.

ALLEN GREENE AND ELISHA DYER, OF PROVIDENCE, RHODE ISLAND.

Letters Patent No. 91,535, dated June 22, 1869.

IMPROVEMENT IN VELOCIPEDE.

The Schedule referred to in these Letters Patent and making part of the same.

*To all whom it may concern:*

Be it known that we, ALLEN GREENE and ELISHA DYER, both of the city and county of Providence, in the State of Rhode Island, have invented a new and useful Improvement in Velocipedes; and we do hereby declare that the following specification, taken in connection with the drawings, making a part of the same, is a full, clear, and exact description thereof.

The drawings exhibit the machine in a perspective view.

Our invention relates to that class of velocipedes known as unicycles, and is designed to secure an apparatus suitable for use by both sexes, which can be worked with greater ease and accomplish a higher rate of speed than other machines of its class.

In the drawings—

A B indicate respectively a double set of spokes, radiating from a central hub, C, and converging toward and joining one common rim, or felloe D.

The figure of the wheel so resulting is that of two segments of a sphere, placed with their bases in juxtaposition, or it may be in the form of an oblate spheroid, if preferred, in which case an intermediate rim should be introduced between the hub of each set of spokes and the common felloe, to secure the proper form and strength.

The distance between the two hubs should be sufficient to give space between the two sets of spokes for the seat for the rider, the frame-work to which it is attached, the hand-crank, and the treadle-gear presently to be described.

A suitable frame-work, *a*, having suspension-eyes at its ends, is hung upon short shafts *b*, which project inward from the hubs.

Upon this frame-work the seat E is placed, and it should depend below the axis of the wheel as far as the interior space will allow.

Each shaft *b* is furnished with a crank, *c*.

From the rear brace of the frame upon which the seat E rests, two fulcrum-posts *d* project downward, to which are pivoted the treadle-levers F, and links G connect such levers with the cranks *c*. A lever of the second order, for operating the cranks, is thereby created.

To prevent the treadles from springing outward while working, and thereby interfering with the spokes of the wheel, they are held inward by suitable martingales *e*.

Reliance is mainly had for driving the machine upon the foot-treadle levers, but hand-cranks H are also attached to a projection of the shaft upon the inner arms of the cranks, to assist the operation of the machine, and to give exercise to the muscles of the upper portion of the body.

Suitable bows *f*, for sustaining a covering, I, to protect the driver, may easily be attached to, and form a part of the carriage-frame-work.

From the foregoing it will be understood that a great gain in power is obtained from the employment of the lever-treadles described.

A wheel, of eight feet in diameter, can be thus propelled with no greater muscular exertion than is required to be put forth to drive a two-wheel velocipede of the usual size, the power to drive which is applied directly to the cranks, while an increase in speed, proportioned to such increased diameter of wheel, is obtained.

The driver of a machine so constructed can maintain his equilibrium more easily than when working the machine in common use, for the reason that the centre of gravity is so low, and, like other unicycles, it can be guided by the inclination of the driver's body to the right or to the left.

To prevent, however, the danger of the machine falling upon its side when at rest, and to assist the operator in starting, we employ lateral supports J, which may be either in the form shown, of braces hinged to the axles, and intended to trail along the ground when the machine is in motion, and brace it when at rest, or such supports may be in the form of wheels, of the same diameter as the driving-wheel, and mounted on axle-shafts projecting from the hub of the driver. This latter arrangement would possess the advantage of being a perfect security against the overturning of the machine, and could be driven by the most unpractised.

What we claim as our invention, and desire to secure by Letters Patent, is—

1. The spheroidal wheel D, having but one rim, with double set of spokes, with separate hubs for each set, between which, within the wheel, is the pendent seat E, in combination with the crank-and-treadle movement, arranged and operating in the manner substantially as shown and described.

2. In combination with a single wheel of the character described, the forked lateral support J, arranged and operating substantially as and for the purpose specified.

ALLEN GREENE.
ELISHA DYER.

Witnesses:
ORVILLE PECKHAM,
CHARLES L. SPENCER.